US012576508B1

(12) United States Patent
Zhang et al.

(10) Patent No.: US 12,576,508 B1
(45) Date of Patent: Mar. 17, 2026

(54) MOBILE ROBOT, CONTROLLER, AND MOBILE ROBOT CONTROL METHOD

(71) Applicant: VisionNav Robotics USA Inc., Acworth, GA (US)

(72) Inventors: Yulin Zhang, Acworth, GA (US); You Liu, Acworth, GA (US); Jiexiong Deng, Acworth, GA (US)

(73) Assignee: VisionNav Robotics USA Inc., Acworth, GA (US)

(*) Notice: Subject to any disclaimer, the term of this patent is extended or adjusted under 35 U.S.C. 154(b) by 0 days.

(21) Appl. No.: 19/195,645

(22) Filed: Apr. 30, 2025

(51) Int. Cl.
| | |
|---|---|
| B25J 13/08 | (2006.01) |
| B25J 5/00 | (2006.01) |
| B25J 9/16 | (2006.01) |

(52) U.S. Cl.
CPC ............... B25J 5/007 (2013.01); B25J 9/161 (2013.01); B25J 9/1666 (2013.01); B25J 13/088 (2013.01)

(58) Field of Classification Search
None
See application file for complete search history.

(56) References Cited

U.S. PATENT DOCUMENTS

| | | | | |
|---|---|---|---|---|
| 2021/0064065 A1* | 3/2021 | Chen | ...................... | G05D 1/102 |
| 2021/0078172 A1* | 3/2021 | Cao | ..................... | G06F 3/04847 |
| 2024/0310860 A1* | 9/2024 | Van De Velde | ....... | G01C 21/20 |

FOREIGN PATENT DOCUMENTS

| | | | | |
|---|---|---|---|---|
| CN | 105737838 A | | 7/2016 | |
| CN | 107390691 A | | 11/2017 | |
| CN | 107608359 A | | 1/2018 | |
| CN | 108180911 B | | 2/2020 | |
| CN | 118689218 A | * 9/2024 | ............. G05D 1/622 |
| CN | 112445216 B | | 2/2025 | |

OTHER PUBLICATIONS

English translation of CN-118689218-A (wherein the paragraph numbering provided coincides with any relevant citations to this reference within the accompanying Office Action) (Year: 2024).*

* cited by examiner

*Primary Examiner* — Jason Holloway
*Assistant Examiner* — Bryant Tang
(74) *Attorney, Agent, or Firm* — MUNCY, GEISSLER, OLDS & LOWE, P.C.

(57) ABSTRACT

A mobile robot, a controller, and a mobile robot control method are provided. The mobile robot includes a processor. The processor is configured to execute program instructions to implement the following steps: when it is determined that the mobile robot deviates from a preset path, determining a return point of the preset path that is closest to the mobile robot; generating a temporary path based on the return point; and driving the mobile robot to return to the preset path according to the temporary path.

18 Claims, 20 Drawing Sheets

MOBILE ROBOT, CONTROLLER, AND MOBILE ROBOT CONTROL METHOD

TECHNICAL FIELD

The present application belongs to the field of artificial intelligence, and specifically relates to a mobile robot, a controller, and a mobile robot control method.

BACKGROUND

With the development of intelligent technologies, unmanned vehicles (such as an automated guided vehicle (AGV) and an autonomous vehicle) are widely applied to fields such as logistics, industrial production, and urban transportation. However, in an operating process of the unmanned vehicle, due to an environmental complexity (e.g. interference from an obstacle, path blocking, and a light change) and a positioning error of equipment itself, the unmanned vehicle may deviate from a preset route. If these deviation situations cannot be effectively processed, the unmanned vehicle may be incapable of completing a task. As a result, the operating efficiency is low, or a collision accident between the unmanned vehicle and a person may occur, causing a risk such as injury and object damage.

SUMMARY OF THE INVENTION

According to this, the present application provides a mobile robot, a controller, and a mobile robot control method, to solve the foregoing problems.

In some embodiments, a mobile robot is provided. The mobile robot includes a processor. The processor is configured to execute program instructions to implement the following steps: when it is determined that the mobile robot deviates from a preset path, determining a return point of the preset path that is closest to the mobile robot; generating a temporary path based on the return point; and driving the mobile robot to return to the preset path according to the temporary path.

In some embodiments, the processor is further configured to implement the following steps: driving, in response to the mobile robot deviating from the preset path, a display apparatus to display a return interaction interface; and determining, based on an interaction performed by a user on the return interaction interface, the return point of the preset path that is closest to the mobile robot.

In some embodiments, the processor is further configured to implement the following step: storing a previous moving task in a memory.

In some embodiments, the processor is further configured to implement the following steps: driving, in response to the mobile robot returning to the preset path, the display apparatus to display a task interaction interface; and loading the previous moving task from the memory based on an input performed by a user on the task interaction interface, and driving the mobile robot to execute the previous moving task.

In some embodiments, the processor is further configured to implement the following steps: based on the interaction performed by the user on the return interaction interface, updating the return point and generating a new temporary path.

In some embodiments, generating the temporary path based on the return point includes: receiving a current pose of the mobile robot that is sensed by a sensor, and determining a start point according to the current pose; and selectively setting a waypoint according to the start point and the return point, to generate the temporary path.

In some embodiments, selectively setting the waypoint according to the start point and the return point, to generate the temporary path includes: not setting the waypoint when no obstacle exists between the start point and the return point.

In some embodiments, selectively setting the waypoint according to the start point and the return point, to generate the temporary path further includes: setting at least one waypoint when an obstacle exists between the start point and the return point.

In some embodiments, each of the at least one waypoint is represented as a function of a two-dimensional coordinate and a body orientation angle of the mobile robot.

In some embodiments, the at least one waypoint includes a first waypoint and a second waypoint that are adjacent to each other, the first waypoint being represented as $(x_1, y_1, \theta_1)$, the second waypoint being represented as $(x_2, y_2, \theta_2)$, and the first waypoint and the second waypoint satisfying the following relations: $x_2 = x_1 + R \sin(\theta_2 - \theta_1)$, $y_2 = y_1 + R(1 - \cos(\theta_2 - \theta_1))$, where R represents a turning radius of the mobile robot; $(x_1, y_1)$ represents the two-dimensional coordinate of the first waypoint; $\theta_1$ represents the body orientation angle of the mobile robot at the first waypoint; $(x_2, y_2)$ represents the two-dimensional coordinate of the second waypoint; and $\theta_2$ represents the body orientation angle of the mobile robot at the second waypoint.

In some embodiments, selectively setting the waypoint according to the start point and the return point to generate the temporary path further includes: generating a plurality of candidate paths between the start point and the return point.

In some embodiments, selectively setting the waypoint according to the start point and the return point, to generate the temporary path further includes: setting a state space boundary, the state space boundary including the start point and the return point.

In some embodiments, selectively setting the waypoint according to the start point and the return point, to generate the temporary path further includes: evaluating the plurality of candidate paths, to score the plurality of candidate paths; and determining, according to scores of the plurality of candidate paths, whether any candidate path in the plurality of candidate paths meets a preset optimization objective.

In some embodiments, selectively setting the waypoint according to the start point and the return point, to generate the temporary path further includes: reducing a target turning radius in response to none of the plurality of candidate paths meeting the preset optimization objective; determining whether the target turning radius is greater than a minimum turning radius; and selecting a candidate path with a highest score from the plurality of candidate paths as the temporary path in response to the target turning radius being less than the minimum turning radius.

In some embodiments, selectively setting the waypoint according to the start point and the return point, to generate the temporary path further includes: selecting, in response to at least one of the plurality of candidate paths meeting the preset optimization objective, the candidate path meeting the preset optimization objective as the temporary path.

In some embodiments, selectively setting the waypoint according to the start point and the return point, to generate the temporary path further includes: generating a plurality of candidate paths again according to the start point and the return point in response to the target turning radius being greater than the minimum turning radius.

In some embodiments, evaluating the plurality of candidate paths, to score the plurality of candidate paths includes: scoring each of the plurality of candidate paths based on whether the candidate path causes the mobile robot to switch from forward movement into backward movement, whether the candidate path includes an S-shaped route, a path curvature of the candidate path, and a length of the candidate path.

In some embodiments, driving the mobile robot to return to the preset path according to the temporary path includes: adjusting, according to a seven-speed planning algorithm, a speed of the mobile robot when the mobile robot moves on the temporary path; and adjusting a front-view distance of the mobile robot according to a curvature of the temporary path and the speed of the mobile robot.

In some embodiments, a controller is provided, including a processor. The processor is configured to execute program instructions to implement the following steps: when it is determined that a mobile robot deviates from a preset path, determining a return point of the preset path that is closest to the mobile robot; generating a temporary path based on the return point; and driving the mobile robot to return to the preset path according to the temporary path.

In some embodiments, a mobile robot control method is provided, including: when it is determined that a mobile robot deviates from a preset path, determining a return point of the preset path that is closest to the mobile robot; generating a temporary path based on the return point; and driving the mobile robot to return to the preset path according to the temporary path.

BRIEF DESCRIPTION OF THE DRAWINGS

The accompanying drawings are intended to provide a further understanding of the present application and constitute a part of this specification. The accompanying drawings and specific implementations below are used together for explaining the present application rather than constituting a limitation on the present application. In the accompanying drawings.

DETAILED DESCRIPTION

Figure 1A:
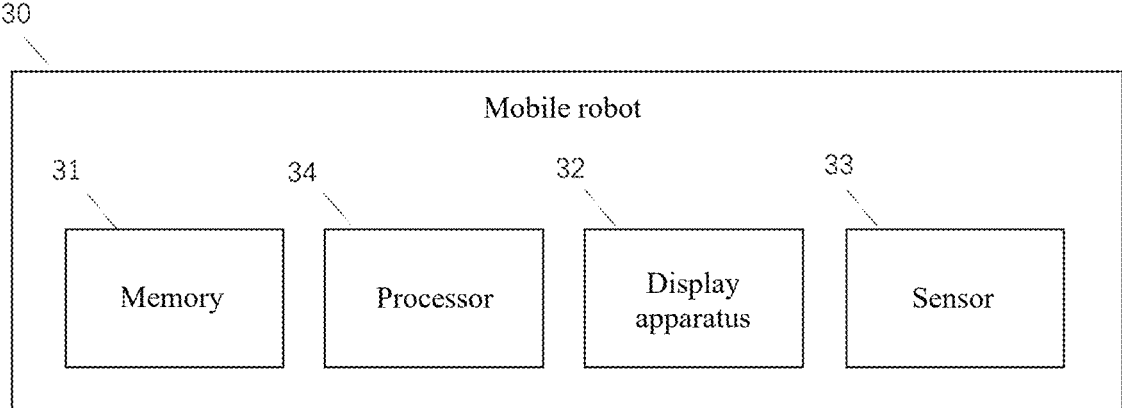
FIG. 1A shows a schematic block diagram of a mobile robot according to an embodiment of the present application.

The following disclosure provides various implementations or examples, which can be used to implement different features of the present application. Specific examples of components and configurations described below are used to simplify the present application. It can be conceived that these descriptions are merely for exemplary purposes, and are not intended to limit the present application. For example, in the following description, a first feature is formed on or above a second feature, which may include some embodiments in which the first feature and the second feature are in direct contact with each other. In addition, some embodiments may alternatively be included that an additional component is formed between the first feature and the second feature, so that the first feature and the second feature may not be in direct contact. In addition, in content of the present application, component symbols and/or numbers may be repeatedly used in a plurality of embodiments. The repeated use is for brevity and clarity, and does not represent a relationship between different discussed embodiments and/or configurations.

In addition, relative spatial terms used herein, such as "below", "under", "above", "over", and the like, may be used for ease of describing a relationship between one component or feature shown in the figure and another component or feature. These relative spatial terms are intended to cover multiple different orientations of an apparatus during use or operation in addition to orientations shown in the figures. The device may be placed at another orientation (for example, rotated by 90 degrees or at another orientation), and these relative spatial description terms should be correspondingly interpreted.

Although numerical ranges and parameters that are used to define a broad scope of the present application are approximate values, relevant values in specific embodiments are presented as precisely as possible herein. However, any value essentially inevitably contains a standard deviation caused by an individual test method. Here, "about" usually means that an actual value is within plus or minus 10%, 5%, 1%, or 0.5% of a particular value or range. Alternatively, the term "about" represents that an actual value falls within an acceptable standard error of an average value, and is determined by consideration of a person of ordinary skill in the art to which the present application belongs. It may be understood that, except experimental examples, or unless otherwise clearly stated, all ranges, amounts, values, and percentages used herein (for example, for describing an amount of a material, a time length, a temperature, an operating condition, a quantity ratio, and the like) are modified by "about". Therefore, unless otherwise specified to the contrary, numerical parameters disclosed in this specification and appended claims are approximate values, and may be changed according to requirements. These numerical parameters should be at least understood as specified valid digits and numerical values obtained by using a common carrying method. Here, a value range is represented to be from one endpoint to another endpoint or between two endpoints. Unless otherwise specified, the value range described here includes the endpoints.

An unmanned vehicle (such as an AGV or an autonomous vehicle) is a device widely applied to intelligent logistics and automated warehousing, and can implement autonomous transportation and access of goods without manual driving. The unmanned vehicle is usually provided with a sensor, a navigation system, and a processor, to ensure efficient and safe operation of the unmanned vehicle. With a rapid increase of modern logistics demands, the unmanned vehicle has become an important tool for improving the operating efficiency and reducing the manpower costs.

In some embodiments, when the unmanned vehicle deviates from a preset route, a user needs to hand-draw a return route, to guide the unmanned vehicle to return according to the hand-drawn route. However, in this method, an interaction interface (such as a touch-control screen) of the unmanned vehicle needs to have high precision. Otherwise, factors such as a size of a finger of the user or a touch pressure may cause a path deviation. In addition, if the precision of path planning is insufficient, the unmanned vehicle cannot accurately return to the preset route. In addition, this technology also highly depends on an operation skill and a determination ability of the user. If the user is not familiar with a system or performs operations improperly, the user may not be able to accurately determine a position and direction of the unmanned vehicle, which finally causes a deviation correction failure or causes more serious consequences. In addition, in a complex or dynamically changing environment (for example, a large number of obstacles exist, light changes greatly, or the like), it may be difficult for the user to accurately determine and draw a proper path.

In some embodiments, when the unmanned vehicle deviates from a preset route, by relying on an external identification such as a two-dimensional code or a radio frequency identification (RFID) that is distributed in an environment, a geometrical relationship between a current pose of the unmanned vehicle and a start pose of the unmanned vehicle is determined, and a speed of returning to the original route is generated. However, if these identifications are damaged, blocked, or lost, the precision of positioning the unmanned vehicle may be affected. In addition, this solution does not consider a change in the environment and a possibility that an obstacle may exist in the environment and be collided by the unmanned vehicle.

FIG. 1A shows a schematic block diagram of a mobile robot 30 according to an embodiment of the present application. In some embodiments, the mobile robot 30 includes a memory 31, a display apparatus 32, a sensor 33, and a processor 34. In some embodiments, the processor 34 is operatively coupled to the memory 31, the display apparatus 32, and the sensor 33. In some embodiments, the processor 34 cooperates with the memory 31, the display apparatus 32, and the sensor 33 to implement a control method provided in the present application. In some embodiments, the processor 34 may be an integrated element. The processor 34 may include a plurality of control units/processing units. The processor 34 may be configured to load data information from the memory 31. The processor 34 may store the data information to the memory 31. The processor 34 may receive and process an input (such as a touch operation) performed by a user on the display apparatus 32 or data sensed by the sensor 33. It should be noted that the present application does not limit the processor 34 to be implemented in hardware, software, or a hardware/software combination.

In some embodiments, the memory 31 may be an integrated element. The memory 31 may be considered as being composed of a plurality of storage units. Information such as, but not limited to, data information such as a point cloud path, a pose, and a key frame may be respectively stored in different storage units or stored in the same storage unit. In some embodiments, the display apparatus 32 may be a touch-control screen. In some embodiments, the sensor 33 is an integrated element. The sensor 33 may be considered being composed of a plurality of sensor elements. In some embodiments, the sensor 33 may include common sensor elements such as a three-dimensional (3D) laser radar, an odometer, a gyroscope, and an accelerometer.

Figure 1B:
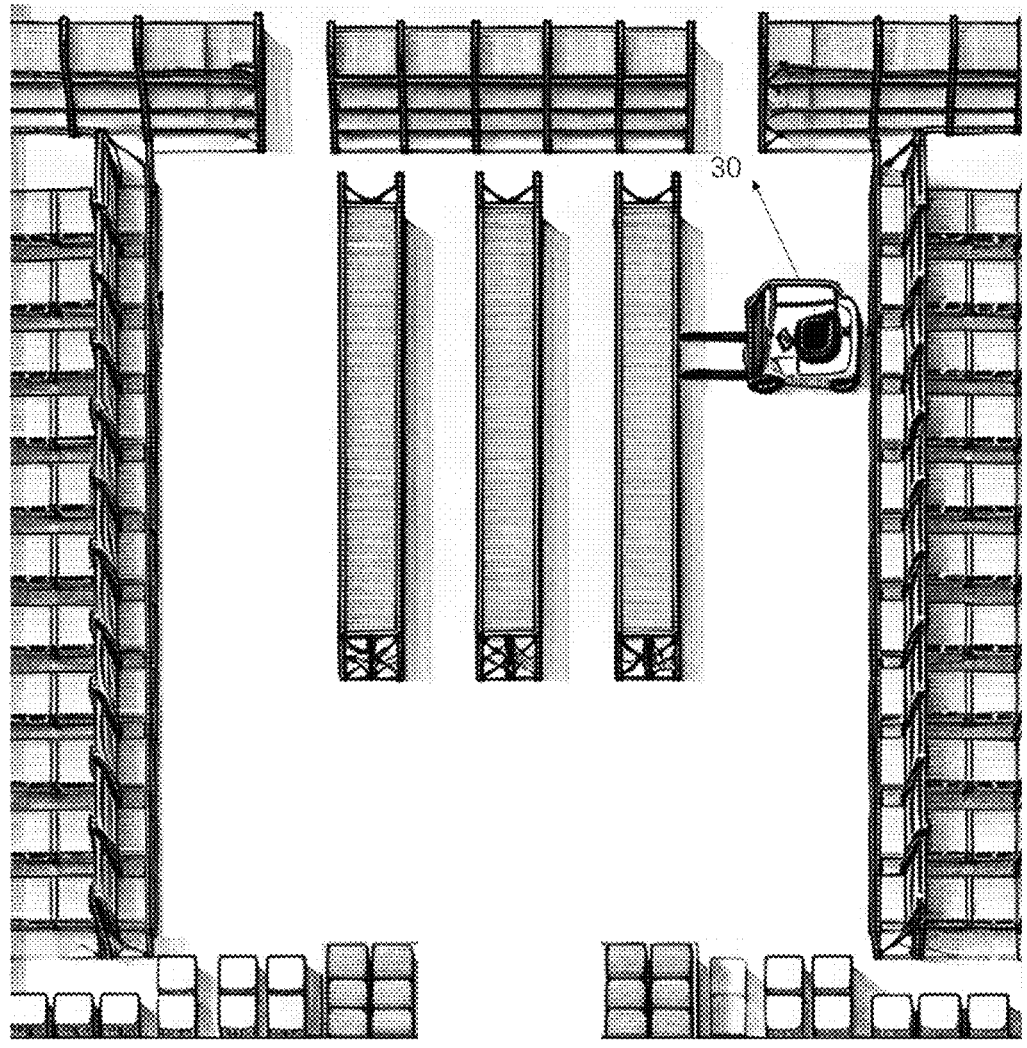
FIG. 1B shows a schematic diagram of use of a mobile robot to a warehouse according to an embodiment of the present application.

The mobile robot 30 in the embodiment of FIG. 1A is a robot that can autonomously or controllably move in an environment. Common forms of the mobile robot 30 include: an AGV, an autonomous mobile robot (AMR), a humanoid robot, and the like. The mobile robot 30 may include another form such as a robot vacuum cleaner. Specifically, the mobile robot 30 may alternatively be an unmanned vehicle, for example, an unmanned pallet truck, applied to a warehouse. Refer to FIG. 1B. FIG. 1B shows a schematic diagram of use of a mobile robot 30 to a warehouse according to an embodiment of the present application. The mobile robot 30 may take goods from a warehouse region according to an instruction, precisely place the goods at a specified location, and dynamically plan a path according to real-time data with cooperation between the sensor 33 and the processor 34, to avoid collision and improve the operating efficiency. It should be noted that the pattern of the mobile robot 30 shown in FIG. 1B is merely used for exemplary description, and is not the only limitation of the present application. In addition, the mobile robot 30 is not limited to being applied to an unmanned vehicle. In another embodiment, the mobile robot 30 may be any intelligent mobile apparatus. In subsequent embodiments, the mobile robot 30 shown in FIG. 1A is used as an example for description.

Figure 2:
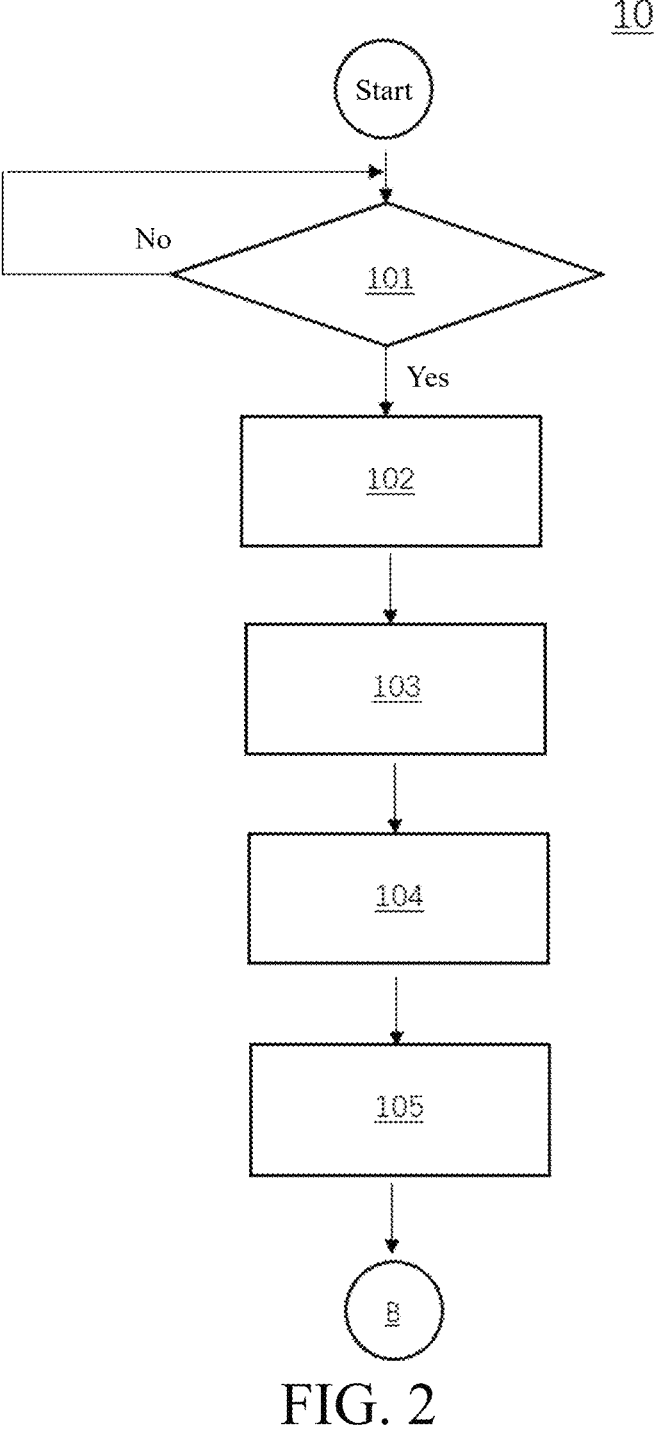
FIG. 2 shows a flowchart of a first part of a control method according to an embodiment of the present application.

FIG. 2 shows a flowchart of a first part of a control method 10 according to an embodiment of the present application. If approximately the same result can be obtained, the present application is not limited to be performed according entirely to steps of the flow shown in FIG. 2. The control method 10 may be applied to the mobile robot 30 shown in FIG. 1A. In some embodiments, the steps of the control method 10 may be performed by different control units/processing units in a processor 34 or the same control unit/processing unit. In some embodiments, the control method 10 may include step 101, step 102, step 103, step 104, and step 105.

In some embodiments, in step 101, the processor 34 may determine whether the mobile robot 30 deviates from a preset path, and if the mobile robot 30 deviates from the preset path, perform step 102; otherwise, perform step 101. In some embodiments, in step 102, the processor 34 may drive the display apparatus 32 to display a return interaction interface. In some embodiments, in step 103, the processor 34 may determine, based on an input performed by a user on the return interaction interface, a return point of the preset path that is closest to the mobile robot 30. In some embodiments, in step 104, the processor 34 may generate a temporary path based on the return point. In some embodiments, in step 105, the processor 34 drives the mobile robot 30 to return to the preset path according to the temporary path.

Figure 3A:
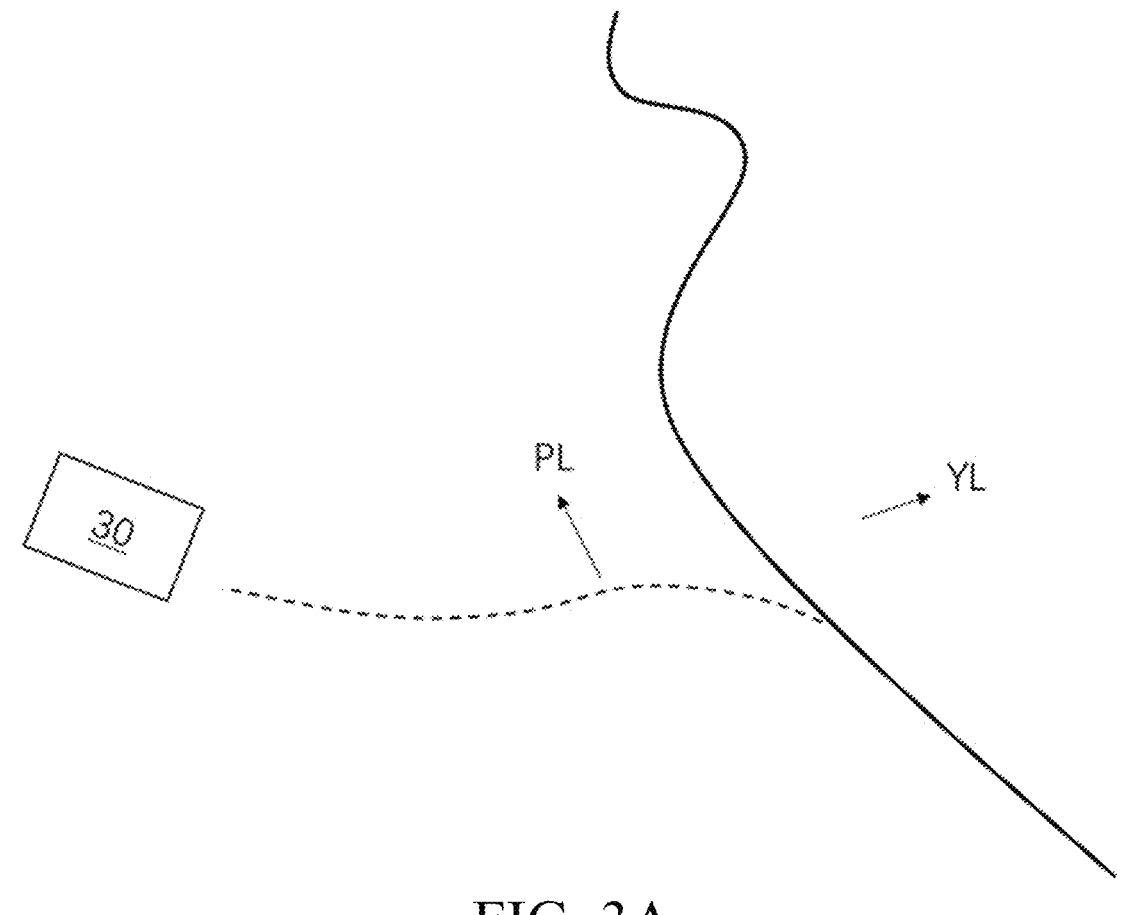
FIG. 3A shows a schematic diagram of a mobile robot deviating from a preset path according to an embodiment of the present application.

Regarding step 101, refer to FIG. 3A. FIG. 3A shows a schematic diagram of the mobile robot 30 deviating from a preset path according to an embodiment of the present application. In some embodiments, the mobile robot 30 may deviate from a preset path YL (shown by the solid line in the figure) due to obstacle interference, path blockage, light change, or a positioning error of the device itself, and further drive into a deviated path PL (shown by the dashed line in the figure).

Figure 3B:
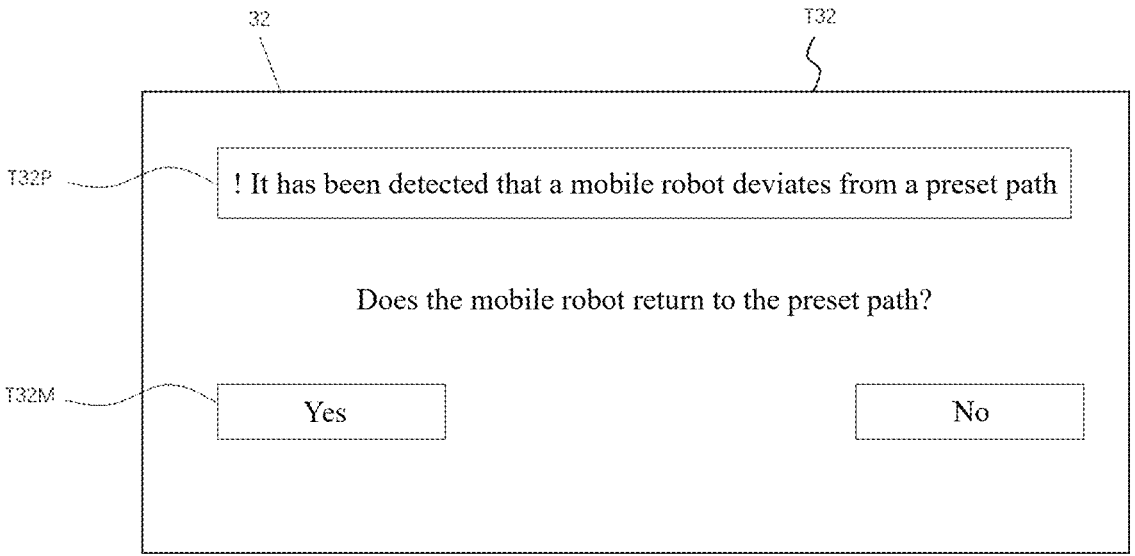
FIG. 3B shows a schematic diagram of a display apparatus displaying a return interaction interface according to an embodiment of the present application.

Regarding step 102, refer to FIG. 3B. FIG. 3B shows a schematic diagram of a display apparatus 32 displaying a return interaction interface T32 according to an embodiment of the present application. In some embodiments, the return interaction interface T32 may include a warning entry T32P and an interaction option T32M. In some embodiments, the warning entry T32P is used for notifying a user that the mobile robot 30 deviates from the preset path YL. In some embodiments, the interaction option T32M is used for receiving an interaction performed by the user on the interaction option T32M, and the interaction indicates whether the mobile robot 30 returns to the preset path YL. In some embodiments, the interaction option T32M may include a button option "Yes" or "No". In some embodiments, the interaction is a tapping operation performed by the user on the interaction option T32M.

In some embodiments, when determining that the mobile robot 30 deviates from the preset path YL, the processor 34 may synchronously store a moving task that is previously performed on the preset path YL into the memory 31. After the mobile robot 30 returns to the preset path YL, the processor 34 reads the previous moving task and drives the mobile robot 30 to complete the moving task.

Figure 3C:
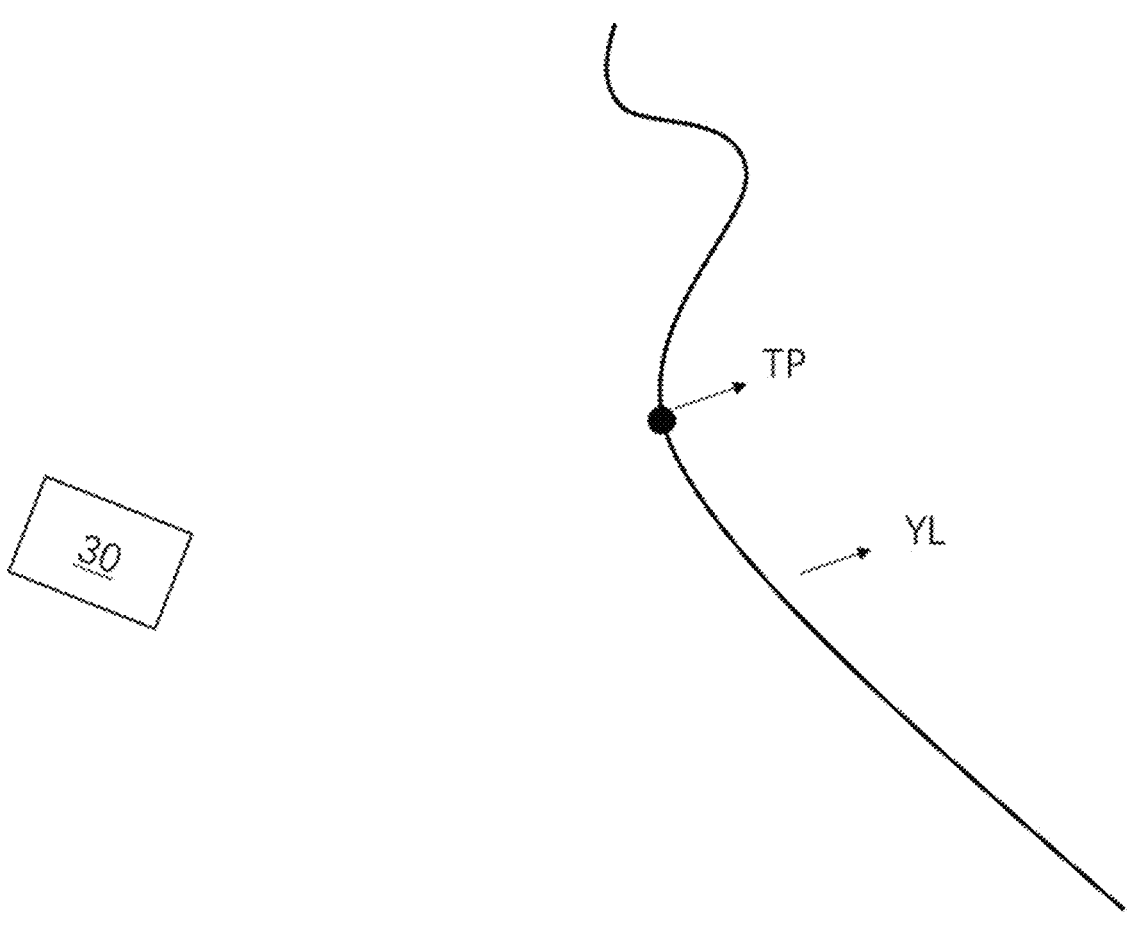
FIG. 3C shows a schematic diagram of determining a return point according to an embodiment of the present application.

Regarding step 103, refer to FIG. 3C. FIG. 3C shows a schematic diagram of determining a return point TP according to an embodiment of the present application. In some embodiments, after a user performs an operation on the return interaction interface T32, the processor 34 determines, on the preset path YL, a point closest to the mobile robot 30 to be the return point TP. In some embodiments, the processor 34 may obtain a current pose of the mobile robot 30 by using a 3D simultaneous localization and mapping (3DSLAM) technology, calculate a point of the preset path YL that is closest to the mobile robot 30, and use the point as the return point TP. In some embodiments, alternatively, the user may directly select a point as the return point TP by performing a tapping operation on the preset path YL through the return interaction interface T32.

Figure 3D:
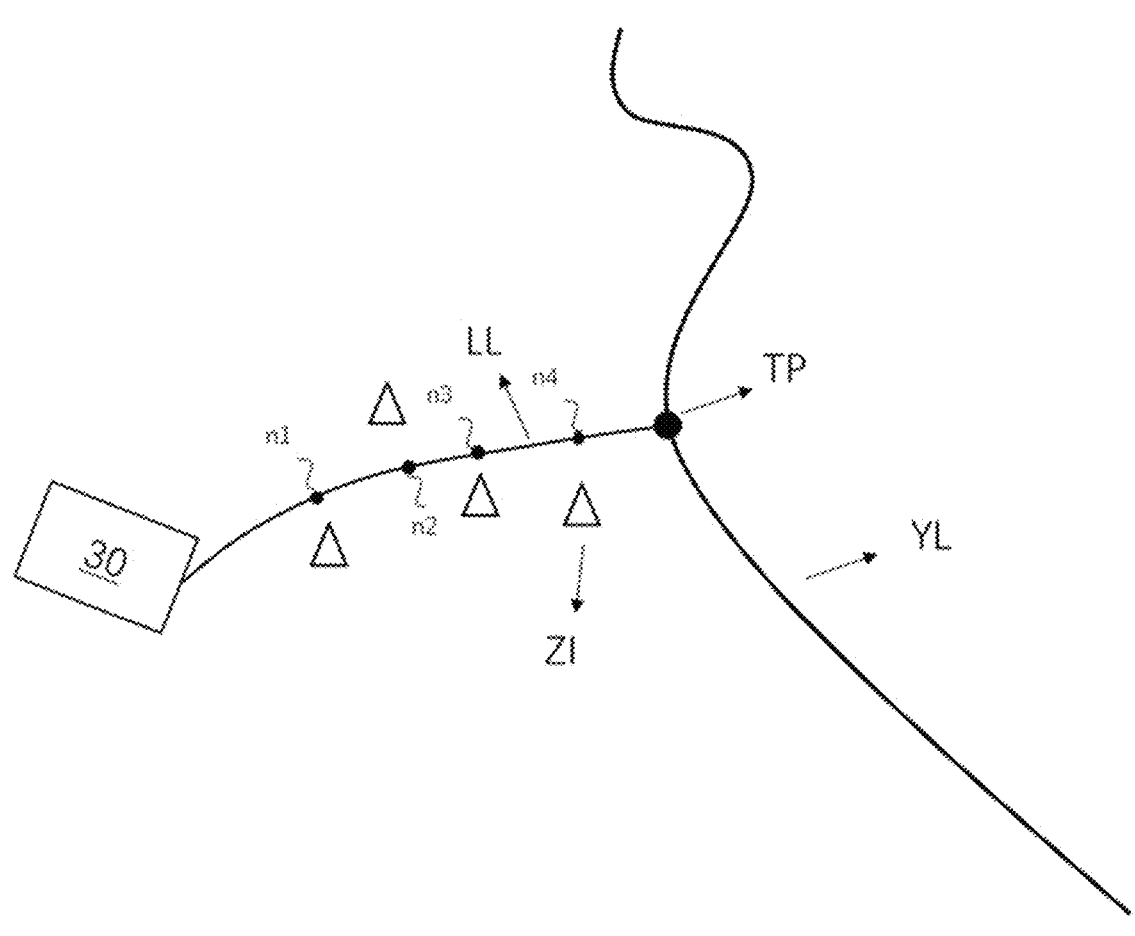
FIG. 3D shows a schematic diagram of generating a temporary path according to an embodiment of the present application.
Figure 4:
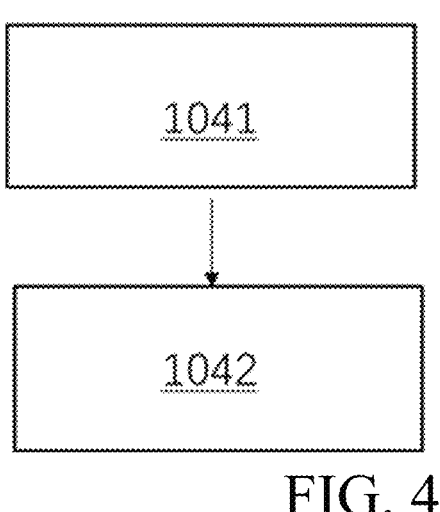
FIG. 4 shows a method flow of a step according to an embodiment of the present application.

Regarding step 104, refer to FIG. 3D. FIG. 3D shows a schematic diagram of generating a temporary path LL according to an embodiment of the present application. In some embodiments, after determining the return point TP, the processor 34 generates the temporary path LL according to the return point TP. For a detailed description of generating the temporary path LL, refer to FIG. 3D and FIG. 4. FIG. 4 shows a method flow of step 104 according to an embodiment of the present application. If approximately the same result can be obtained, the present application is not limited to be performed according entirely to steps of the flow shown in FIG. 4. In some embodiments, step 104 may include step 1041 and step 1042.

In some embodiments, in step 1041, the processor 34 may receive a current pose of the mobile robot 30 that is sensed by a sensor 33, and use the current pose as a start point. In some embodiments, in step 1042, the processor 34 may selectively set a waypoint according to the start point and the return point TP, the waypoint being used for avoiding obstacle on the temporary path LL.

It can be understood that when no obstacle exists between the start point and the return point TP, the processor 34 may not set any waypoint, and directly generate the temporary path LL. When an obstacle exists between the start point and the return point TP, the processor 34 sets at least one (for example, one or more) waypoint, thereby generating the temporary path LL that avoids the obstacle. A person skilled in the art should understand that a specific quantity of waypoints may be set according to a quantity and density of obstacles and in conjunction with factors such as route optimization of the mobile robot 30. The embodiment of FIG. 3D is described by using an example in which the processor 34 sets a plurality of waypoints n1 to n4 to avoid an obstacle ZI, and then generates the temporary path LL. In some embodiments, the waypoints n1 to n4 may be represented as functions of two-dimensional coordinates and body orientation angles.

Figure 12:
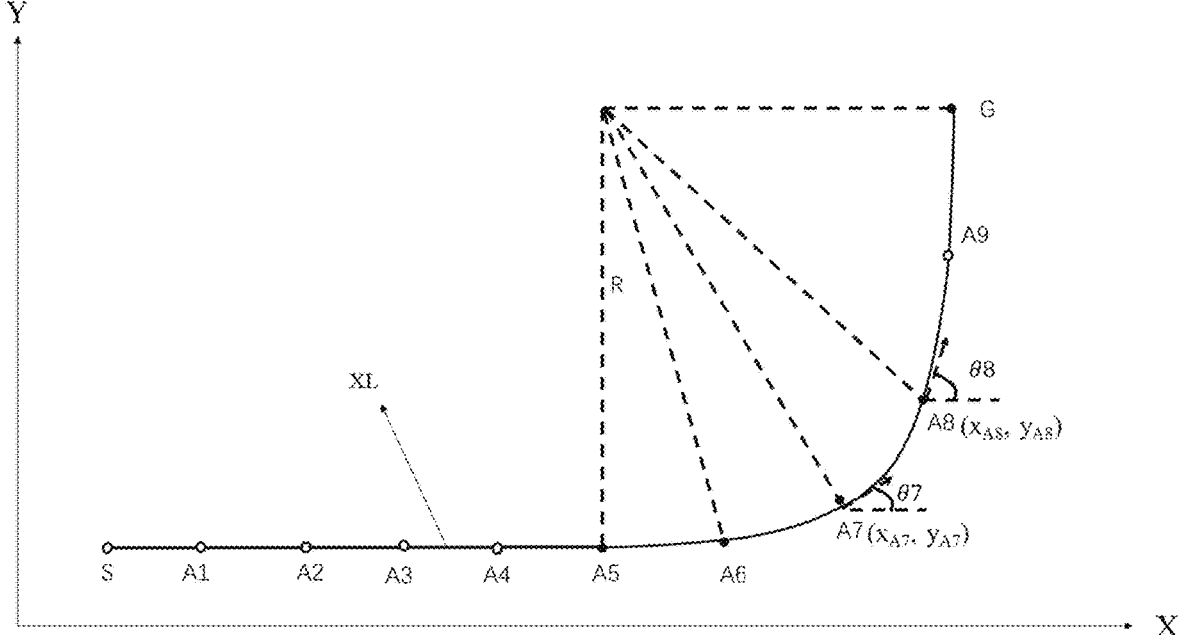
FIG. 12 shows a temporary path according to another embodiment of the present application.

Regarding a relation of a waypoint, refer to FIG. 12. FIG. 12 shows a temporary path XL according to another embodiment of the present application. In a two-dimensional plane expanded on X axis-Y axis, the temporary path XL uses point S as a start point and point G as a return point, and passes through waypoints A1 to A9. Waypoints A7 and A8 are taken for example. Waypoint A7 has a two-dimensional coordinate $(x_{A7}, y_{A7})$ on the two-dimensional plane, and waypoint A8 has a two-dimensional coordinate $(x_{A8}, y_{A8})$ on the two-dimensional plane. When a mobile robot travels along the temporary path XL to waypoint A7, an angle between a body orientation of the mobile robot and the X axis is $\theta_7$. When the mobile robot travels along the temporary path XL to waypoint A8, an angle between a body orientation of the mobile robot and the X axis is $\theta_8$. In this case, adjacent waypoints A7 and A8 satisfy the following relations:

$$x_{A8}=x_{A7}+R\sin(\theta_8-\theta_7), \; y_{A8}=y_{A7}+R(1-\cos(\theta_8-\theta_7)).$$

Where R is a turning radius of the mobile robot. Similarly, two adjacent waypoints (such as A1 and A2, and A2 and A3) can satisfy the foregoing relations.

Refer to FIG. 3D again. Adjacent waypoints n1 and n2 are taken for example. Waypoint n1 may be represented as $(x_1, y_1, \theta_1)$, and waypoint n2 may be represented as $(x_2, y_2, \theta_2)$. Where $(x_1, y_1)$ and $(x_2, y_2)$ respectively represent coordinates of waypoints n1 and n2 in a two-dimensional space; $\theta_1$ represents a body orientation angle of the mobile robot 30 at waypoint n1, and $\theta_2$ represents a body orientation angle of the mobile robot 30 at waypoint n2. It can be understood that when the mobile robot 30 is an unmanned vehicle, $\theta_1$ represents a vehicle front-end orientation angle of the unmanned vehicle at waypoint n1, $\theta_2$ represents a vehicle front-end orientation angle of the unmanned vehicle at waypoint n2. In some embodiments, functions of adjacent waypoints n1 and n2 may satisfy $x_2=x_1+R\sin(\theta_2-\theta_1)$, $y_2=y_1+R(1-\cos(\theta_2-\theta_1))$. It can be understood that, adjacent waypoints n2 and n3, and adjacent waypoints n3 and n4 may satisfy the relation (1). The temporary path LL is determined by setting waypoints n1 to n4 according to the foregoing relations.

Figure 5A:
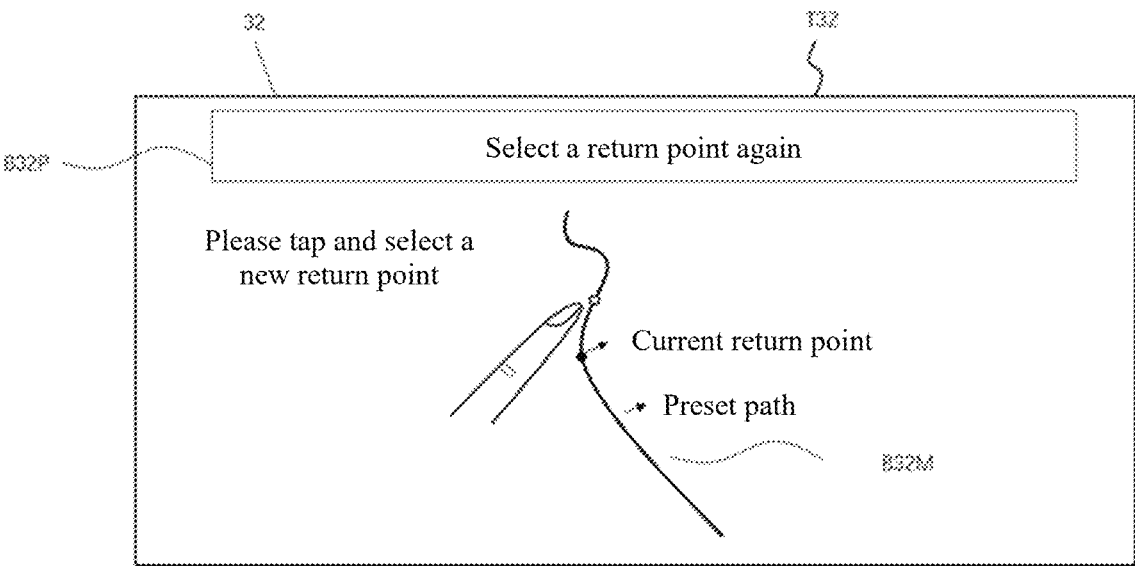
FIG. 5A shows a schematic diagram of replacing a return point according to an embodiment of the present application.

In another embodiment, after the processor 34 generates the temporary path LL according to the return point TP, a user may still replace the return point TP to generate a new temporary path LL. Refer to FIG. 5A. FIG. 5A shows a schematic diagram of replacing the return point TP according to an embodiment of the present application. In some embodiments, when the user decides to replace the return point TP, the display apparatus 32 displays the return inter-action interface T32 again for user interaction. In some embodiments, the return interaction interface T32 may include a prompt entry B32P and an interaction block B32M. In some embodiments, the prompt entry B32P is used for prompting the user to reselect a return point.

In some embodiments, the interaction block B32M is used for receiving an interaction performed by the user on the interaction block B32M, and the interaction is used for indicating a new return point. In some embodiments, the interaction block B32M may display the preset path YL and a current return point TP. In some embodiments, the inter-action is a tapping operation performed on the interaction block B32M. The new return point is determined by tapping the preset path YL displayed on the interaction block B32M.

Figure 5B:
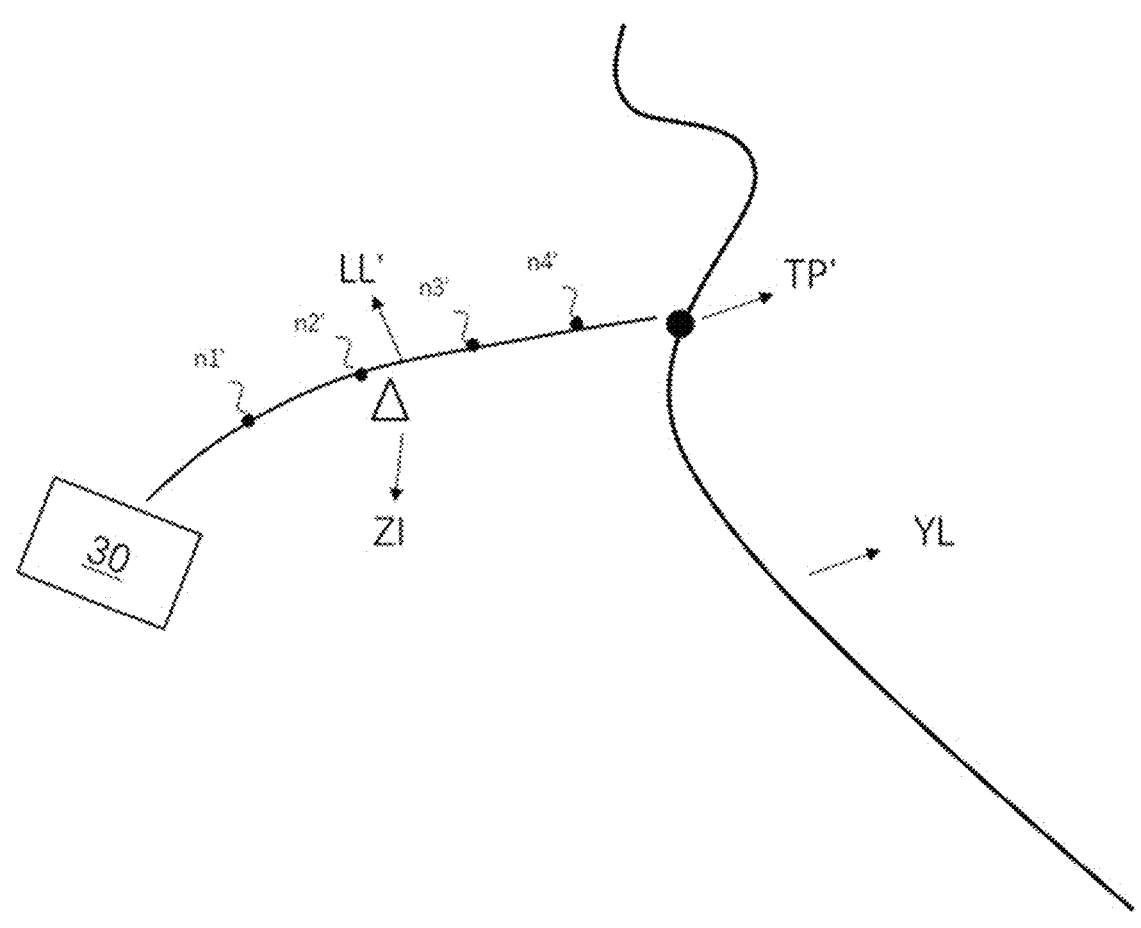
FIG. 5B shows a schematic diagram of generating a temporary path according to a newly selected return point according to an embodiment of the present application.

FIG. 5B shows a schematic diagram of generating a temporary path LL' according to a newly selected return point TP' according to an embodiment of the present appli-cation. In some embodiments, after the user performs inter-action on the return interaction interface T32 to select the new return point TP', the processor 34 generates the new temporary path LL' according to a pose of the return point TP'. In some embodiments, the processor 34 sets a plurality of waypoints n1' to n4' according to a current pose of the mobile robot 30 and the pose of the return point TP', to avoid the obstacle ZI, thereby generating the temporary path LL'.

Figure 6:
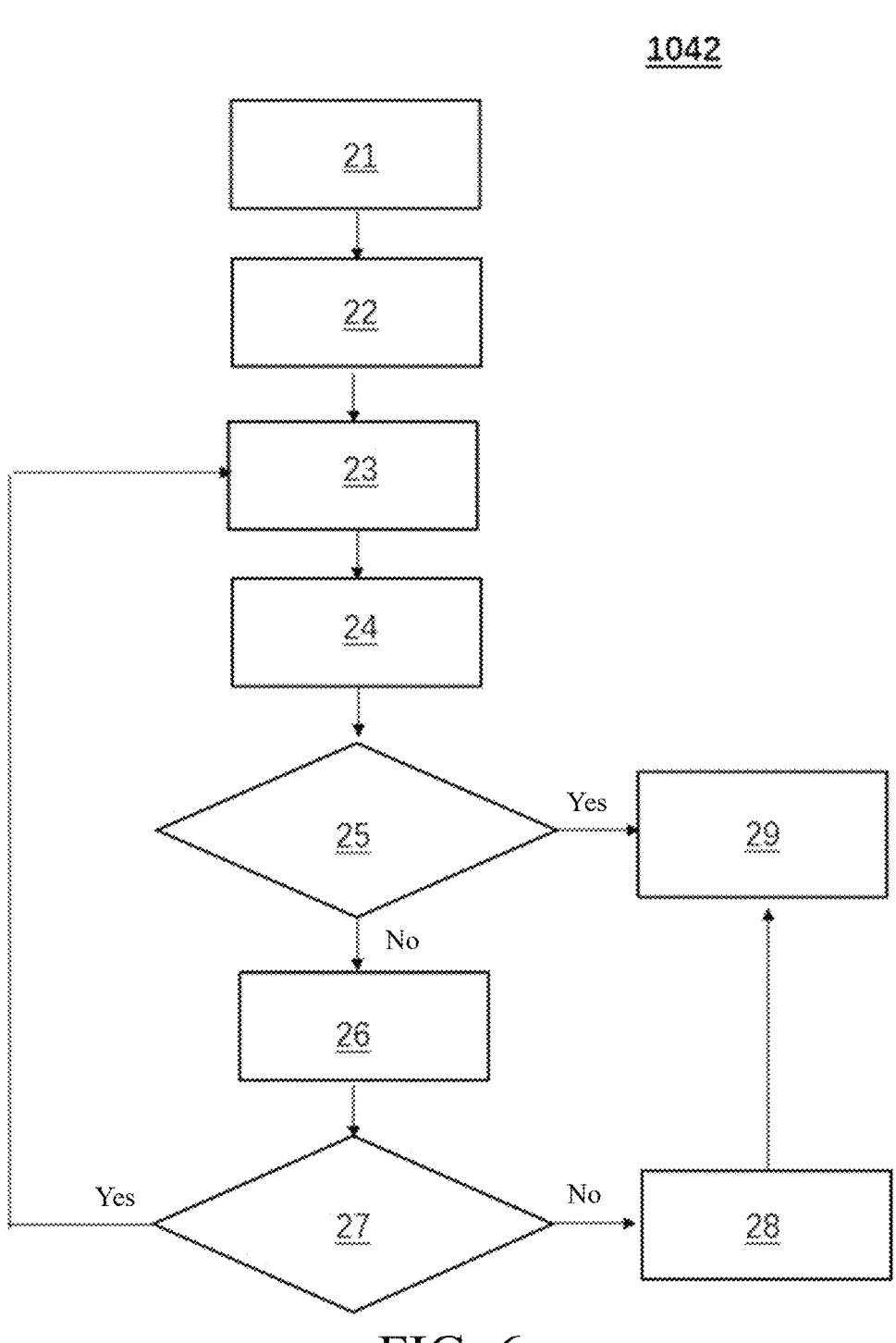
FIG. 6 shows a method flow of a step according to an embodiment of the present application.

For a detailed description of step 1042, refer to FIG. 6. FIG. 6 shows a method flow of step 1042 according to an embodiment of the present application. If approximately the same result can be obtained, the present application is not limited to be performed according entirely to steps of the flow shown in FIG. 6. In some embodiments, step 1042 may include step 21, step 22, step 23, step 24, step 25, step 26, step 27, step 28, and step 29.

In some embodiments, in step 21, the processor 34 may initialize the turning radius of the mobile robot 30. In some embodiments, in step 22, the processor 34 may set a state space boundary, the state space boundary defining a move-ment range of the mobile robot 30. The state space boundary includes the start point and the return point TP. For example, a state space may be an entire warehouse, and the state space boundary is a range inside the warehouse, thereby limiting the mobile robot 30 to only move within the range of the warehouse. In some embodiments, in step 23, the processor 34 may generate a plurality of candidate paths between the start point and the end point. In some embodiments, the processor 34 may generate a plurality of candidate paths according to the current pose of the mobile robot 30 and the pose of the return point TP. In some embodiments, the plurality of candidate paths may be generated according to a turning radius R of the mobile robot 30.

In some embodiments, in step 24, the processor 34 may evaluate the plurality of candidate paths, to score the plu-rality of candidate paths. In some embodiments, in step 25, the processor 34 may determine whether any candidate path in the plurality of candidate paths meets a preset optimiza-tion objective, and if there is at least one candidate path in the plurality of candidate paths meets the preset optimization objective, perform step 29; otherwise, perform step 26. In some embodiments, in step 26, the processor 34 may reduce a target turning radius. In some embodiments, in step 27, the processor 34 may determine whether the target turning radius is greater than a minimum turning radius, and if the target turning radius is greater than the minimum turning radius, perform step 23; otherwise, perform step 28. In some embodiments, in step 28, the processor 34 may select a candidate path with a highest score from the plurality of candidate paths as the temporary path LL. In some embodi-ments, in step 29, the processor 34 may generate the temporary path LL.

Figure 7A:
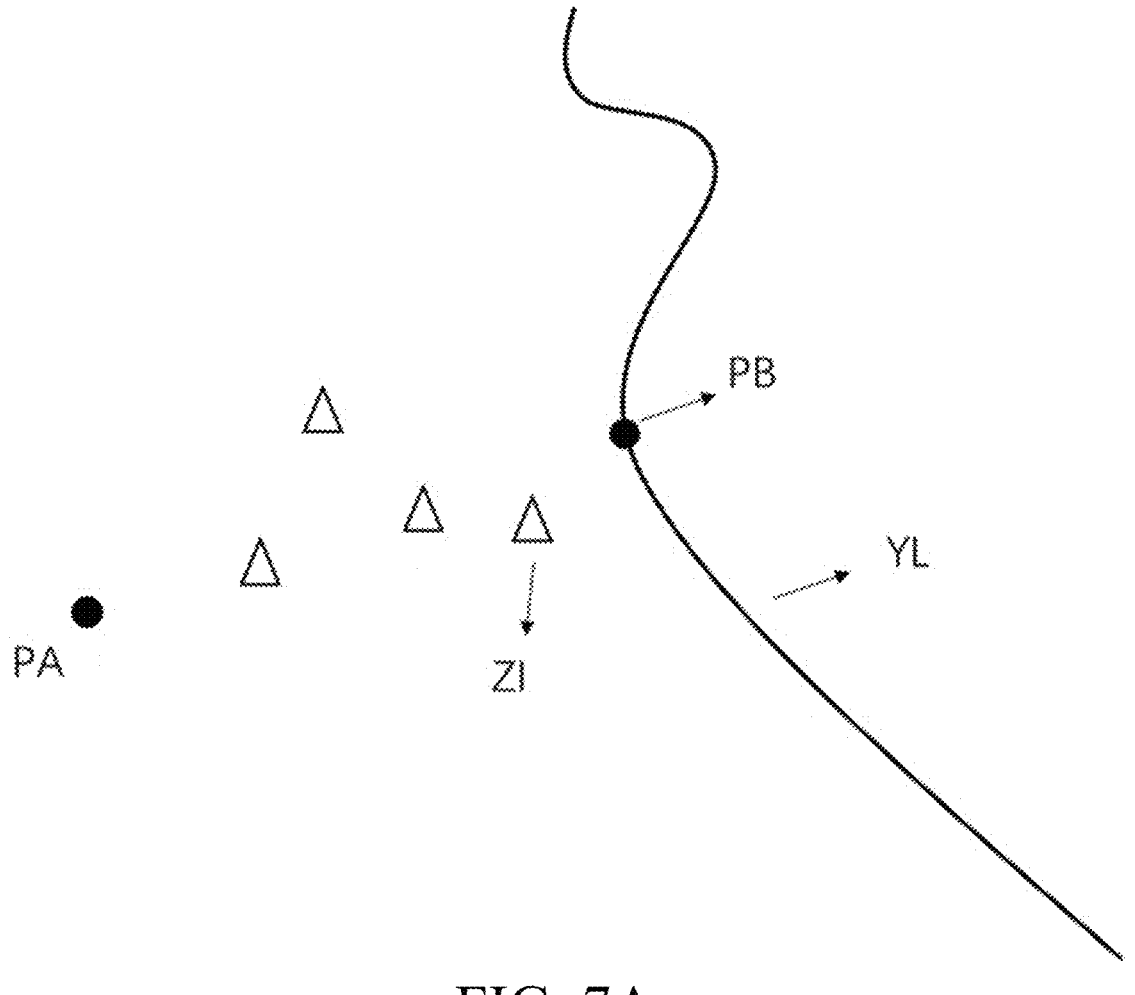
FIG. 7A shows a schematic diagram of determining a start point and an end point according to an embodiment of the present application.
Figure 7B:
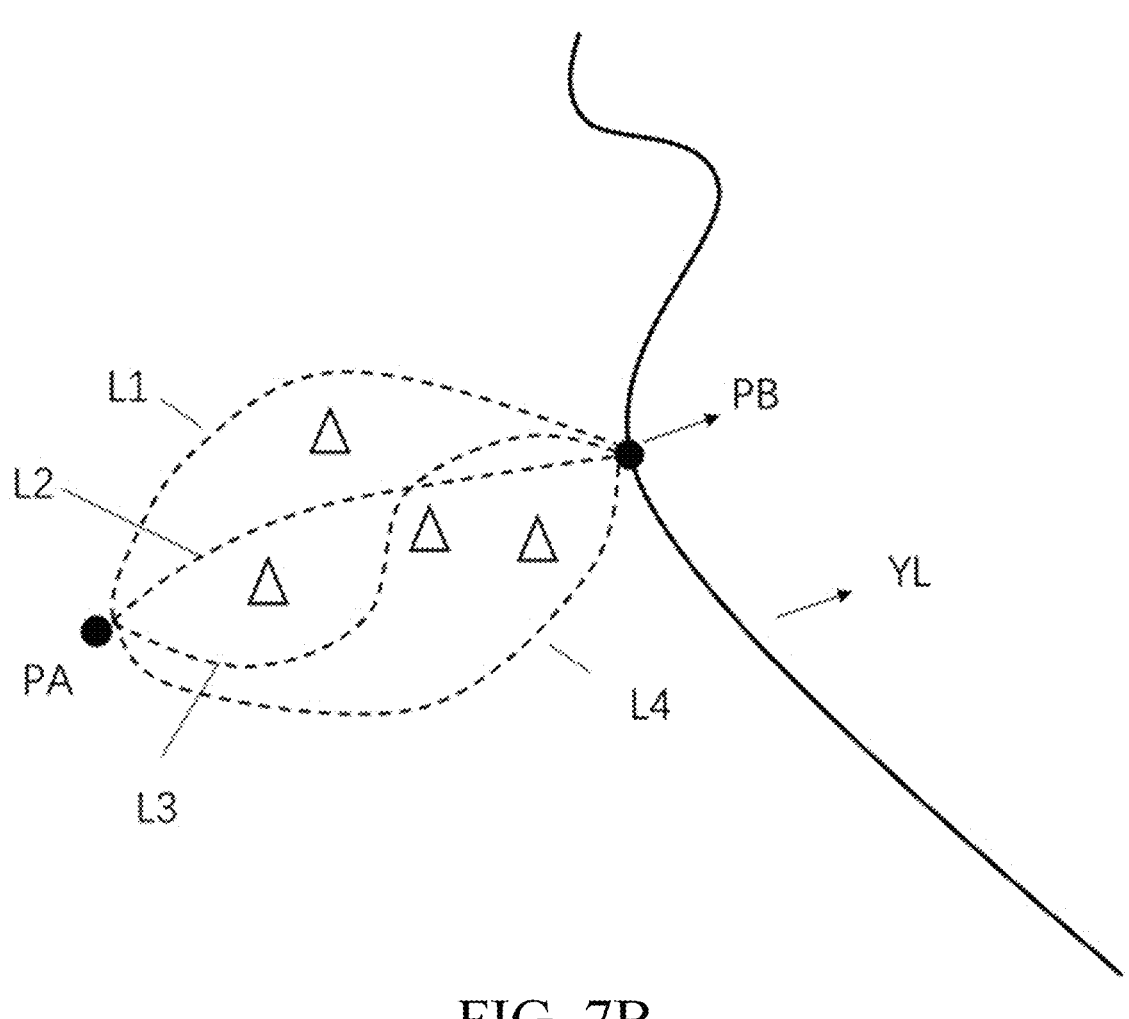
FIG. 7B shows a schematic diagram of generating a candidate path according to an embodiment of the present application.

Refer to FIG. 6, FIG. 7A, and FIG. 7B at the same time. As shown in FIG. 7A, the processor 34 uses the current position of the mobile robot 30 as a start point PA, and uses the return point TP as an end point PB. Then, the processor 34 sets a turning radius R of the mobile robot 30. Next, as shown in FIG. 7B, the processor 34 generates, between the start point PA and the end point PB, candidate path L1, candidate path L2, candidate path L3, and candidate path L4 that satisfy the turning radius R. Next, the processor 34 scores candidate path L1, candidate path L2, candidate path L3, and candidate path L4.

In some embodiments, the processor 34 may evaluate whether each candidate path can cause the mobile robot 30 to have a direction change from forward movement to backward movement, whether each candidate path includes an S-shaped route that causes the mobile robot 30 to twist, a path curvature of each candidate path, and a length of each candidate path. In some embodiments, the processor 34 may respectively sets corresponding weights for the foregoing factors, and calculates a score of each candidate path accord-ing to an actual condition of each candidate path and the corresponding weight. In some embodiments, the processor 34 sets a rating score as the preset optimization objective in advance.

In some embodiments, each candidate path may be scored according to the following formula:

$$\text{score}=W\_d*\text{is\_change\_direction}+$$
$$W\_c*\text{kappa\_change}+W\_k*\text{kappa}+$$
$$W\_l*\text{normalized\_path\_len}.$$

Where change_direction indicates whether a driving mode needs to be changed (from a D mode to an R mode, or from the R mode to a D mode, a numerical value of which may be 0 or 1; when the driving mode of the vehicle is changed, 1 is used, or 0 is used); and kappa_change indicates that if an S-shaped arc path exists (for example, a left-turn arc followed by a right-turn arc), kappa_change is a sum of absolute values of curvatures of the two arcs. For example, if a curvature of a first left-turn arc is k1, and a curvature of a second arc is k2, kappa_change is equa to k1+k2; kappa represents an absolute value of a maximum curvature of an arc in the path (if no arc exists, it is 0); normalized_path_len is obtained by dividing a path length by a Euclidean distance (namely, a linear distance) from the start point PA to the end point PB; W_d, W_c, W_k, and W_1 represent punishment weights. The numerical values are preset to be negative. Lower punishment strength indicates a smaller final score.

In some embodiments, the preset optimization objective G_s may be set to −100. When the score of any candidate path (such as candidate path L2) is higher than the preset optimization objective G_s, candidate path L2 meets the preset optimization objective. The processor 34 generates the temporary path LL according to candidate path L2.

In some embodiments, if the scores of candidate path L1, candidate path L2, candidate path L3, and candidate path L4 are not higher than the preset optimization objective, the processor 34 may reduce the turning radius of the mobile robot 30. If the adjusted turning radius is still greater than the preset minimum turning radius, the processor 34 may regenerate a plurality of candidate paths between the start point PA and the end point PB, and score the candidate paths. If the adjusted turning radius is less than the preset minimum turning radius, the processor 34 generates the temporary path LL according to the candidate path (such as candidate path L2) with the highest score.

Figure 7C:
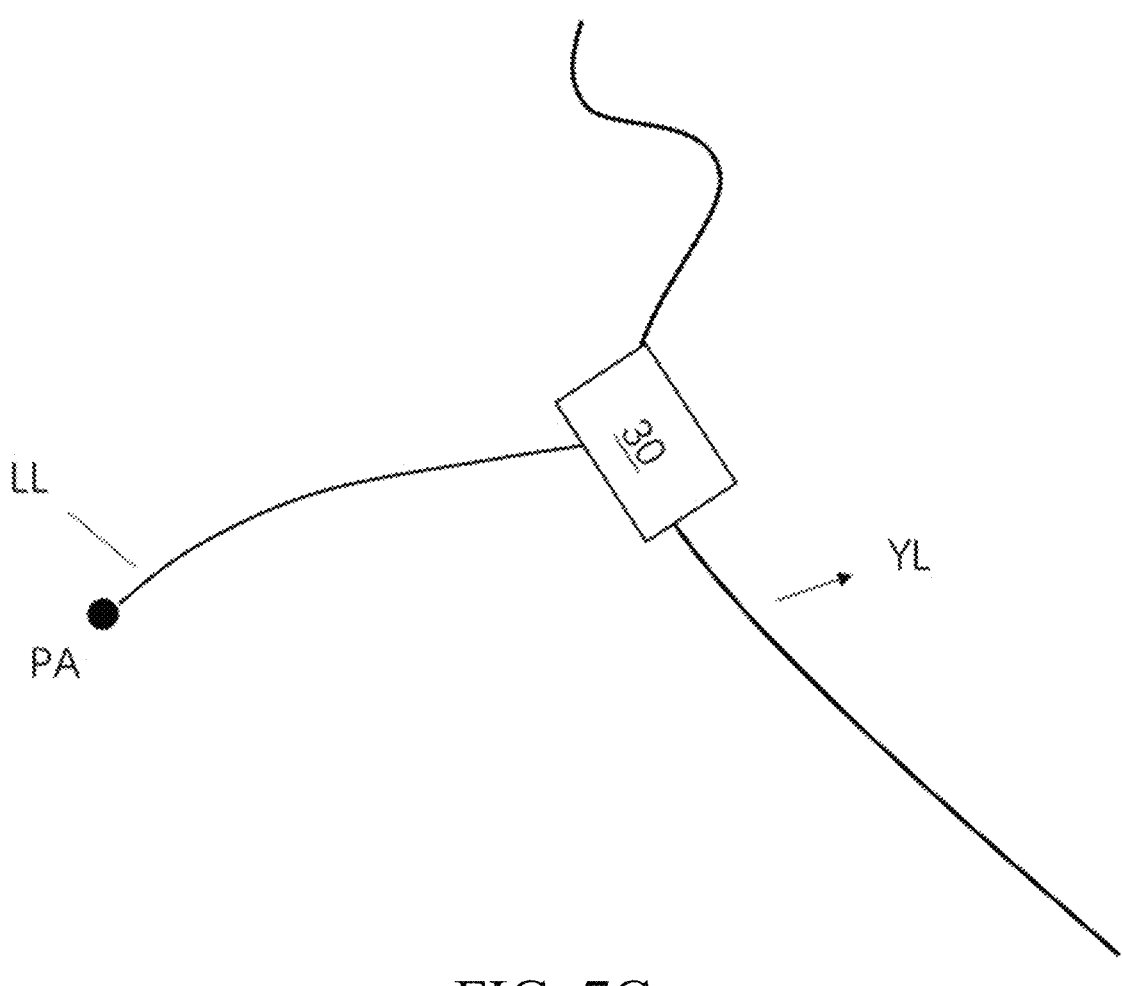
FIG. 7C shows a schematic diagram of returning to a preset path according to an embodiment of the present application.

Next, as shown in FIG. 7C, after the temporary path LL is generated, the processor 34 drives the mobile robot 30 to move according to the temporary path LL to return to the preset path YL. When the mobile robot 30 moves on the temporary path LL, the processor 34 may adjust a speed of the mobile robot 30 moving on the temporary path LL. In some embodiments, the processor 34 may adjust, according to a seven-speed planning algorithm, the speed of movement of the mobile robot 30, so that an acceleration curve generated when the mobile robot 30 moves is smooth, and a non-continuous acceleration will not occur, thereby relieving stress and vibration effects on a transmission chain and a load.

Figure 8:
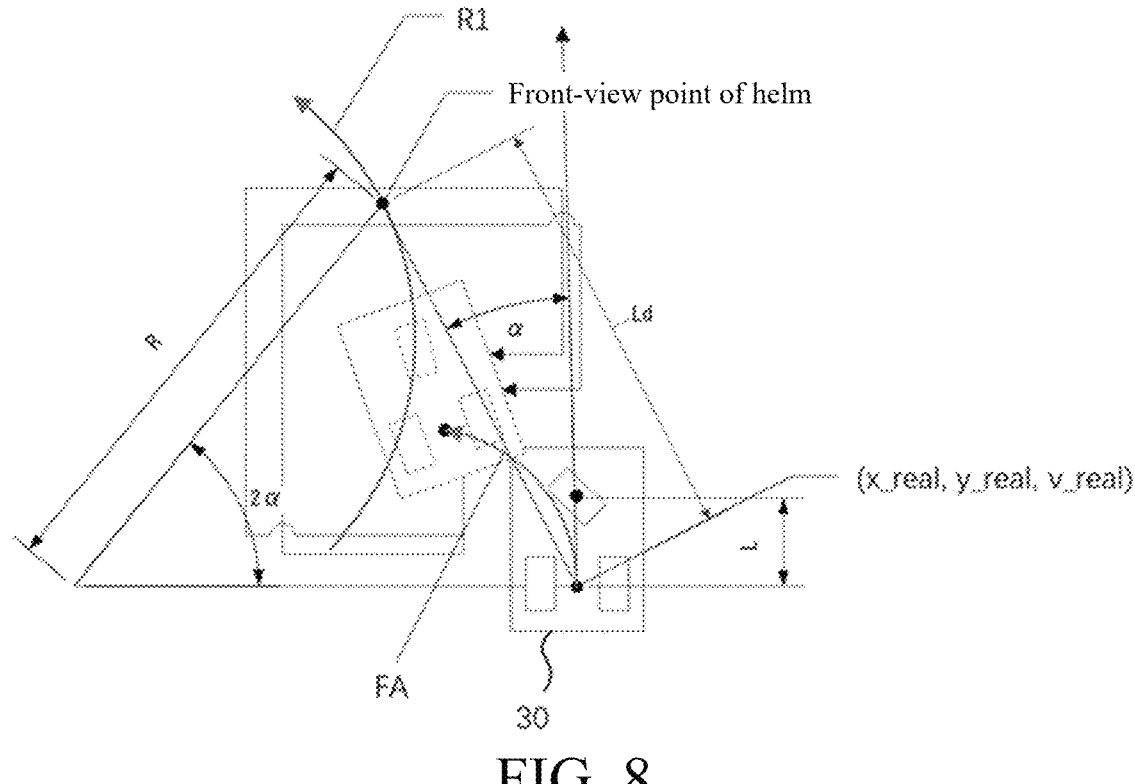
FIG. 8 shows a schematic diagram of adjusting a front-view distance of a mobile robot according to an embodiment of the present application.

When the mobile robot 30 moves on the temporary path LL, the processor 34 uses a fuzzy logic and a path tracking and control policy of pure tracking to provide a corresponding front-view distance according to the curvature of the temporary path LL and the speed of the mobile robot 30. In some embodiments, the processor 34 may adjust the front-view distance of the mobile robot 30 according to relations between curvatures and speeds listed in Table 1 below.

point. The front-view distance Ld can affect the movement stability and trajectory tracking precision of the mobile robot 30. In FIG. 8, the curve R1 is a reference trajectory, and the arrow FA displays a current movement direction of the mobile robot 30. A direction angle oc is adjusted to gradually approach the reference trajectory R1, where a direction angle oc is an angle by which the mobile robot 30 needs to rotate to track the reference trajectory, namely, an angle between a current movement direction of the mobile robot 30 and a direction of the reference trajectory; L represents a vehicle wheel base of the mobile robot 30; and a relation of the wheel base L, the direction angle oc, and a path curvature may be represented as $R=L/\tan(oc)$. It can be known from the relation that a longer wheel base L indicates a larger minimum turning radius R of the mobile robot 30, which reduces the turning flexibility, but the movement stability is improved. A shorter wheel base L indicates that the mobile robot 30 can move at a smaller turning radius R, but is unstable at a high speed.

When the current front-view distance Ld is short, the mobile robot 30 has higher tracking sensitivity to the trajectory, so that the mobile robot 30 can be quickly adjusted to approach a target reference trajectory R1. However, the mobile robot 30 may move unstably and vibrate.

When the current front-view distance Ld is long, the mobile robot 30 moves more steadily and turns more gently, but the trajectory following precision may be reduced, especially at a sharp turn. The processor 34 adjusts the front-view distance Ld of the mobile robot 30 according to the relations between the curvatures and the speeds listed in Table 1 above, so that the tracking precision can be improved, and the movement stability can be maintained.

In some embodiments, when a difference between a helm angle sent by the processor 34 and an actual helm angle exceeds 30 degrees, the processor 34 drives the mobile robot

TABLE 1

| Curvature | Speed | | | | | | |
| | Front view Negative large | Front view Negative medium | Front view Negative small | Front view Zero | Front view Positive small | Front view Positive medium | Front view Positive large |
| --- | --- | --- | --- | --- | --- | --- | --- |
| Negative large | Medium | Negative medium | Negative large | Negative large | Negative large | Negative medium | Medium |
| Negative medium | Positive small | Medium | Negative small | Negative large | Negative small | Medium | Positive small |
| Negative small | Positive medium | Medium | Negative small | Negative large | Negative small | Medium | Positive medium |
| Zero | Positive large | Positive large | Positive small | Medium | Positive small | Positive large | Positive large |
| Positive small | Positive medium | Medium | Negative small | Negative large | Negative small | Medium | Positive medium |
| Positive medium | Positive small | Medium | Negative small | Negative large | Negative small | Medium | Positive small |
| Positive large | Medium | Negative medium | Negative large | Negative large | Negative large | Negative medium | Medium |

Refer to FIG. 8. FIG. 8 shows a schematic diagram of adjusting a front-view distance of a mobile robot 30 according to an embodiment of the present application. In some embodiments, a front-view distance Ld of the mobile robot 30 is calculated by the mobile robot according to a current pose (x_real, y_real, v_real) in a moving process. In an accumulated distance sequence along a reference trajectory R1, a trajectory point corresponding to a 1st accumulated distance point that is less than the front-view distance Ld is a front-view point. The front-view distance Ld corresponds to a linear distance from a current position to the front-view

30 to start to decelerate according to a deceleration until the helm angle is in place. In some embodiments, a deceleration formula is: v_input=v_last_input−v_decelerate, where v_input represents a speed sent in a current period; v_last_input represents a speed sent in a previous period; and v_decelerate represents a calibrated deceleration.

In Table 1, when a bend curvature of a route is large (such as the curvature [positive large/negative large] in the table) and a vehicle speed is high (such as the vehicle speed [positive large/negative large] in the table), an adjustment value of the front-view distance of the mobile robot 30 is

[medium], which is equivalent to that in a case that there is a sharp bend ahead and the mobile robot 30 has a current low speed, a short front-view distance needs to be considered, and a road condition in a short distance range needs to be focused on. In Table 1, when a route is close to a straight line (namely, the curvature [zero] in the table) and a vehicle speed is low (namely, the vehicle speed [zero] in the table), an adjustment value of the front-view distance of the mobile robot 30 is [medium], which is equivalent to that in a case that there is a straight route and the mobile robot 30 has a low speed, the mobile robot 30 can plan a next path and action in advance.

Figure 9:
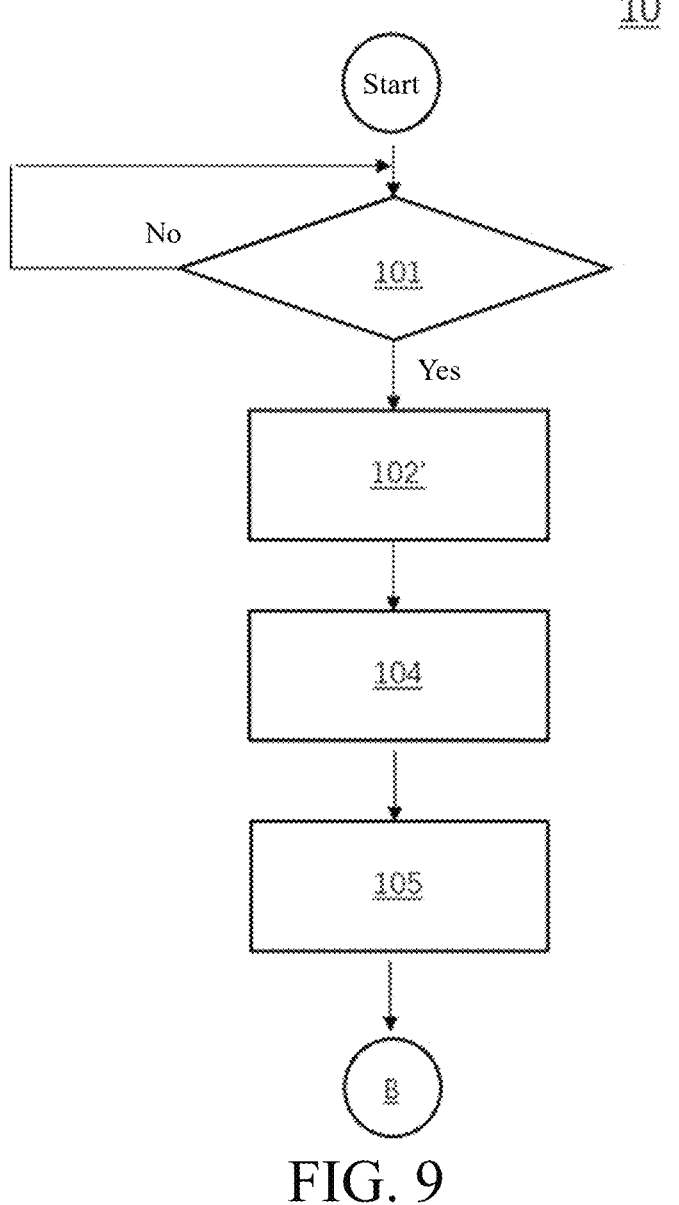
FIG. 9 shows a flowchart of a first part of a control method according to another embodiment of the present application.

FIG. 9 shows a flowchart of a first part of a control method 10 according to another embodiment of the present application. If approximately the same result can be obtained, the present application is not limited to be performed according entirely to steps of the flow shown in FIG. 9. In some embodiments, the control method 10 may include step 101, step 102', step 104, and step 105. The method flow shown in FIG. 9 is different from the method flow shown in FIG. 2 in step 102'. Therefore, parts, which are the same as those of the embodiment in FIG. 2, of the embodiment in FIG. 9 are not described in detail again.

In some embodiments, in step 102', the processor 34 may determine a return point of the preset path that is closest to the mobile robot 30. In the embodiment of FIG. 9, after the processor 34 determines that the mobile robot 30 deviates from the preset path in step 101, the processor 34 may directly determine the return point of the preset path that is closest to the mobile robot 30t, without driving the display apparatus 32 to display the return interaction interface to interact with a user, then perform the following step 104 and step 105 to continue the control method 10.

Figure 10:
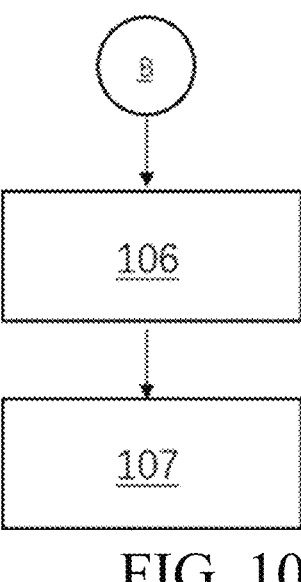
FIG. 10 shows a flowchart of a second part of a control method according to an embodiment of the present application.

FIG. 10 shows a flowchart of a second part of a control method 10 according to an embodiment of the present application. If approximately the same result can be obtained, the present application is not limited to be performed according entirely to steps of the flow shown in FIG. 10. The second part of the control method 10 is be performed after step 105 shown in FIG. 2 or FIG. 9. In some embodiments, the control method 10 may further include step 106 and step 107.

In some embodiments, in step 106, the processor 34 may drive the display apparatus 32 to display a task interaction interface. In some embodiments, in step 107, the processor 34 may load a previous moving task from the memory 31, and drive the mobile robot 30 to perform the previous moving task.

Figure 11:
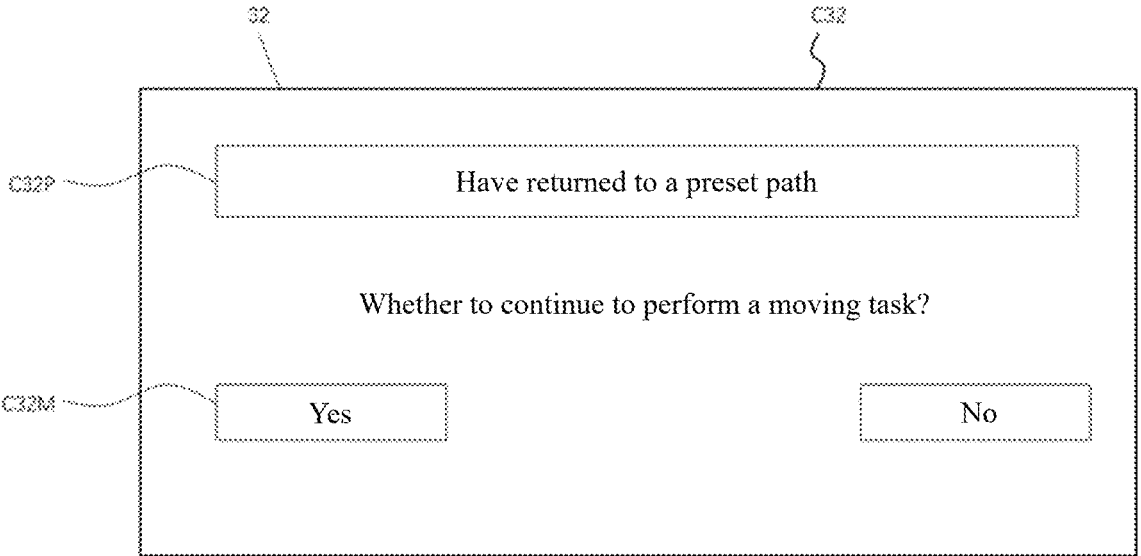
FIG. 11 shows a schematic diagram of a display apparatus displaying a task interaction interface according to an embodiment of the present application.

Regarding step 106, refer to FIG. 11. FIG. 11 shows a schematic diagram of the display apparatus 32 displaying a task interaction interface C32 according to an embodiment of the present application. In some embodiments, the task interaction interface C32 may include a prompt entry C32P and an interaction option C32M. In some embodiments, the prompt entry C32P is used for notifying a user that the mobile robot 30 has returned to the preset path YL. In some embodiments, the interaction option C32M is used for receiving an interaction performed by the user on the interaction option C32M, and the interaction is used for instructing the mobile robot 30 to continue to perform the previous moving task. In some embodiments, the interaction option C32M may include an option button "Yes" or "No". In some embodiments, the interaction is a tapping operation performed on the interaction option C32M. After receiving an interaction performed by the user on the task interaction interface C32, the processor 34 drives the mobile robot 30 to continue to perform the previous moving task.

According to the control method 10 provided in the present application, the mobile robot 30 may be first positioned by using 3DSLAM, without an external identification such as a two-dimensional code or an RFID. In addition, the control method 10 does not rely on an operation skill and a determination ability of a user. Even if the user is not familiar with a system principle, the user can still make the mobile robot 30 return to the preset path YL by the simple tapping operation. In addition, the control method 10 considers obstacles in an environment when planning the temporary path LL, so that collision between the mobile robot 30 and the obstacles can be avoided, thereby improving the safety. In addition, the control method 10 adjusts the speed of the mobile robot 30 by using the seven-speed planning algorithm when the mobile robot 30 moves on the temporary path LL, and adjusts the front-view distance of the mobile robot 30 according to the curvature of the temporary path LL and the speed of the mobile robot 30, thereby greatly reducing stress and vibration effects on a transmission chain and a load, and improving the movement stability of the mobile robot 30.

Figure 13:
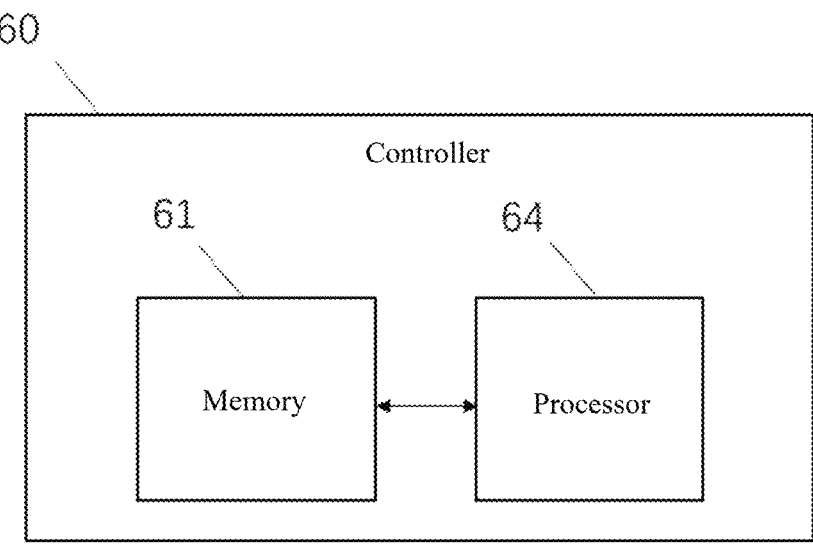
FIG. 13 shows a schematic diagram of a controller according to an embodiment of the present application.

FIG. 13 shows a schematic diagram of a controller 60 according to an embodiment of the present application. In some embodiments, the controller 60 includes a memory 61 and a processor 64. In some embodiments, the memory 61 and the processor 64 are the same as the memory 31 and the processor 34 in the embodiment of FIG. 1A. In some embodiments, when the controller 60 is applied to a mobile apparatus (for example, but not limited to, a mobile robot), the processor 64 may cooperate with a display apparatus and a sensor assembly of the mobile apparatus to perform a control method 10, so that the mobile apparatus can instantly return to the path when deviating from a preset path. In some embodiments, the controller 60 may be a plug and play apparatus. In some embodiments, the controller 60 may be connected to the mobile apparatus in a wired or wireless manner.

As used herein, the terms "approximately", "basically", "basic", and "about" are used to describe and consider small changes. When used in conjunction with an event or situation, the term can refer to examples of events or situations occurring precisely and examples of events or situations occurring very approximately. As used herein relative to a given value or range, the term "about" generally means within ±10%, ±5%, ±1%, or ±0.5% of the given value or range. The range can be represented herein as from one end point to another end point or between two end points. Unless otherwise specified, all scopes disclosed herein include end points. The term "basically coplanar" can refer to two surfaces located along the same plane within a few micrometers (μm), for example, located along the same plane within 10 μm, 5 μm, 1 μm, or 0.5 μm. When values or characteristics are "basically" the same, the term can refer to values within ±10%, ±5%, ±1%, or ±0.5% of an average value of the values mentioned.

As used herein, the terms "approximately", "basically", "basic", and "about" are used to describe and explain small changes. When used in conjunction with an event or situation, the term can refer to examples of events or situations occurring precisely and examples of events or situations occurring very approximately. For example, when used in conjunction with a value, the term can refer to a change range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values can be considered as being "basically" or "approximately" the same.

For example, being "basically" parallel can refer to an angle change range less than or equal to ±10° relative to 0°, for example, less than or equal to ±5°, less than or equal to ±4°, less than or equal to ±3, less than or equal to ±2°, less than or equal to ±1, less than or equal to ±0.5°, less than or equal to ±0.1, or less than or equal to ±0.05°. For example, being "basically" perpendicular can refer to an angle change range less than or equal to ±100 relative to 90°, for example, less than or equal to ±5°, less than or equal to ±4°, less than or equal to ±3, less than or equal to ±2°, less than or equal to ±1, less than or equal to ±0.5°, less than or equal to ±0.1°, or less than or equal to ±0.05°.

For example, if a displacement between two surfaces is equal to or less than 5 μm, equal to or less than 2 μm, equal to or less than 1 μm, or equal to or less than 0.5 μm, the two surfaces can be considered as being coplanar or basically coplanar. If a displacement between any two points on a surface relative to a plane is equal to or less than 5 μm, equal to or less than 2 μm, equal to or less than 1 μm, or equal to or less than 0.5 μm, the surface can be considered as being a plane or basically a plane.

As used herein, the singular terms "a/an" and "the" may include plural indicators unless the context otherwise specifies. In some embodiments, an assembly being "on" or "above" another assembly may cover a situation where the previous assembly is directly on the latter assembly (for example, in physical contact with the latter assembly), and a situation where one or more intermediate assemblies are located between the previous assembly and the latter assembly.

As used herein, for ease of description, spatial relative terms such as "below", "under", "beneath", "above", "upper part", "lower part", "left side", "right side", and the like can be used herein to describe a relationship between one assembly or feature and another assembly or feature as illustrated in the figure. In addition to the orientations depicted in the figures, the spatial relative terms are intended to encompass different orientations of devices in use or operation. Equipment can be oriented in other ways (rotated 90 degrees or in other orientations), and the spatial relative descriptors used herein can also be explained correspondingly. It should be understood that when an assembly is referred to as "connected to" or "coupled to" another assembly, it can be directly connected or coupled to another assembly, or there can be an intermediate assembly.

The previous text provides an overview of several embodiments and detailed features of the present application. The embodiments described in the present application can be easily used as a basis for designing or modifying other processes, as well as structures for performing the same or similar purposes and/or obtaining the same or similar advantages of the embodiments introduced herein. These equivalent constructions do not depart from the spirit and scope of the present application, and different changes, substitutions, and changes can be made without departing from the spirit and scope of the present application.

We claim:

1. A mobile robot, comprising a processor, the processor being configured to perform program instructions to implement the following steps:

when it is determined that the mobile robot deviates from a preset path, determining a return point of the preset path that is closest to the mobile robot;

generating a temporary path based on the return point, comprising:

receiving a current pose of the mobile robot that is sensed by a sensor, and determining a start point according to the current pose; and selectively setting a waypoint according to the start point and the return point, to generate the temporary path, comprising:

generating a plurality of candidate paths between the start point and the return point; and selecting one of the plurality of candidate paths as the temporary path; and driving the mobile robot to return to the preset path according to the temporary path.

2. The mobile robot according to claim 1, wherein the processor is further configured to implement the following steps:

driving, in response to the mobile robot deviating from the preset path, a display apparatus to display a return interaction interface; and determining, based on an interaction performed by a user on the return interaction interface, the return point of the preset path that is closest to the mobile robot.

3. The mobile robot according to claim 1, wherein the processor is further configured to implement the following step:

storing a previous moving task in a memory.

4. The mobile robot according to claim 3, wherein the processor is further configured to implement the following steps:

driving, in response to the mobile robot returning to the preset path, the display apparatus to display a task interaction interface; and loading the previous moving task from the memory based on an input performed by a user on the task interaction interface, and driving the mobile robot to execute the previous moving task.

5. The mobile robot according to claim 2, wherein the processor is further configured to implement the following step:

based on the interaction performed by the user on the return interaction interface, updating the return point and generating a new temporary path.

6. The mobile robot according to claim 1, wherein selectively setting the waypoint according to the start point and the return point, to generate the temporary path comprises:

not setting the waypoint when no obstacle exists between the start point and the return point.

7. The mobile robot according to claim 6, wherein selectively setting the waypoint according to the start point and the return point, to generate the temporary path further comprises:

setting at least one waypoint when an obstacle exists between the start point and the return point.

8. The mobile robot according to claim 7, wherein each of the at least one waypoint is represented as a function of a two-dimensional coordinate and a body orientation angle of the mobile robot.

9. The mobile robot according to claim 8, wherein the at least one waypoint comprises a first waypoint and a second waypoint that are adjacent to each other, the first waypoint

17 being represented as $(x_1, y_1, \theta_1)$, the second waypoint being represented as $(x_2, y_2, \theta_2)$, and the first waypoint and the second waypoint satisfying the following relations:

$$x_2 = x_1 + R\sin(\theta_2 - \theta_1),\ y_2 = y_1 + R(1 - \cos(\theta_2 - \theta_1));$$

wherein R represents a turning radius of the mobile robot; $(x_1, y1)$ represents the two-dimensional coordinate of the first waypoint; $\theta_1$ represents the body orientation angle of the mobile robot at the first waypoint; $(x_2, y_2)$ represents the two-dimensional coordinate of the second waypoint; and $\theta_2$ is the body orientation angle of the mobile robot at the second waypoint.

10. The mobile robot according to claim 1, wherein selectively setting the waypoint according to the start point and the return point, to generate the temporary path further comprises:

setting a state space boundary, the state space boundary comprising the start point and the return point.

11. The mobile robot according to claim 1, wherein selectively setting the waypoint according to the start point and the return point, to generate the temporary path further comprises:

evaluating the plurality of candidate paths, to score the plurality of candidate paths; and determining, according to scores of the plurality of candidate paths, whether at least one candidate path in the plurality of candidate paths meets a preset objective.

12. The mobile robot according to claim 11, wherein selectively setting the waypoint according to the start point and the return point, to generate the temporary path further comprises:

reducing a target turning radius in response to none of the plurality of candidate paths meeting the preset objective;

determining whether the target turning radius is greater than a minimum turning radius; and selecting a candidate path with a highest score from the plurality of candidate paths as the temporary path in response to the target turning radius being less than the minimum turning radius.

13. The mobile robot according to claim 12, wherein selectively setting the waypoint according to the start point and the return point, to generate the temporary path further comprises:

selecting, in response to at least one of the plurality of candidate paths meeting the preset objective, the candidate path meeting the preset objective as the temporary path.

14. The mobile robot according to claim 9, wherein selectively setting the waypoint according to the start point and the return point, to generate the temporary path further comprises:

generating a plurality of candidate paths again according to the start point and the return point in response to the target turning radius being greater than the minimum turning radius.

15. The mobile robot according to claim 11, wherein evaluating the plurality of candidate paths, to score the plurality of candidate paths comprises:

scoring each of the plurality of candidate paths based on whether the candidate path causes the mobile robot to switch from forward movement into backward movement, whether the candidate path comprises an S-shaped route, a path curvature of the candidate path, and a length of the candidate path.

16. The mobile robot according to claim 1, wherein driving the mobile robot to return to the preset path according to the temporary path comprises:

adjusting, according to a seven-speed planning algorithm, a speed of the mobile robot when the mobile robot moves on the temporary path; and adjusting a front-view distance of the mobile robot according to a curvature of the temporary path and the speed of the mobile robot.

17. A controller, comprising a processor, the processor being configured to perform program instructions to implement the following steps:

when it is determined that a mobile robot deviates from a preset path, determining a return point of the preset path that is closest to the mobile robot;

generating a temporary path based on the return point, comprising:

receiving a current pose of the mobile robot that is sensed by a sensor, and determining a start point according to the current pose; and selectively setting a waypoint according to the start point and the return point, to generate the temporary path, comprising:

generating a plurality of candidate paths between the start point and the return point; and selecting one of the plurality of candidate paths as the temporary path; and driving the mobile robot to return to the preset path according to the temporary path.

18. A mobile robot control method, comprising:

when it is determined that a mobile robot deviates from a preset path, determining a return point of the preset path that is closest to the mobile robot;

generating a temporary path based on the return point, comprising:

receiving a current pose of the mobile robot that is sensed by a sensor, and determining a start point according to the current pose; and selectively setting a waypoint according to the start point and the return point, to generate the temporary path, comprising:

generating a plurality of candidate paths between the start point and the return point; and selecting one of the plurality of candidate paths as the temporary path; and driving the mobile robot to return to the preset path according to the temporary path.

\* \* \* \* \*